Jan. 19, 1937.  A. ELMENDORF  2,068,098
FASTENING PANELS THAT SHRINK
Filed Feb. 24, 1936  2 Sheets-Sheet 1
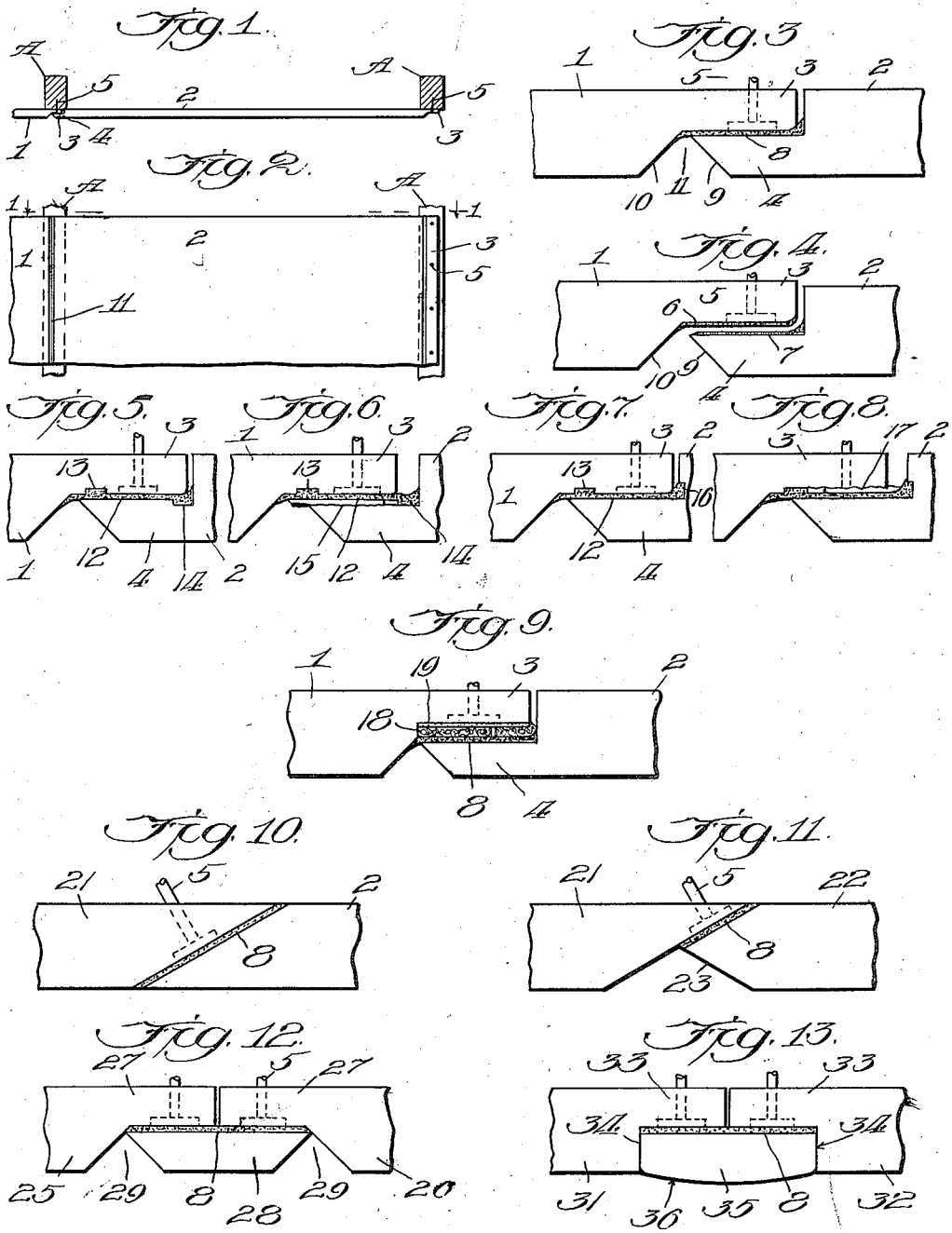

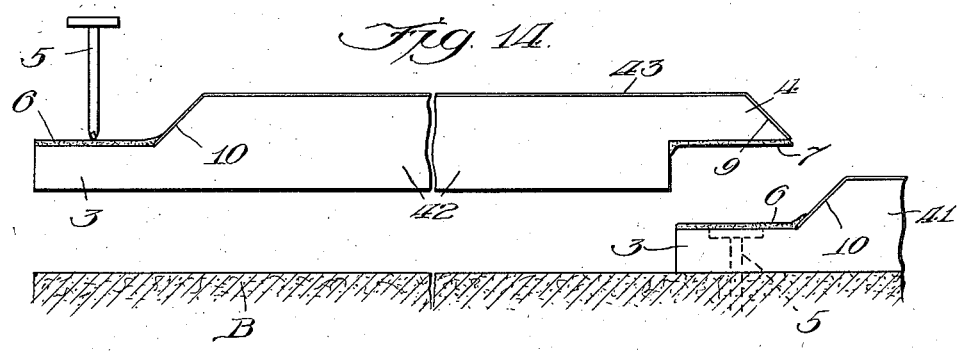
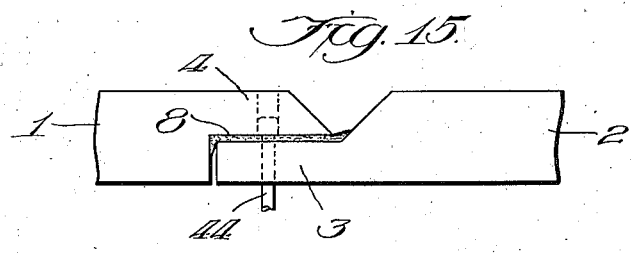
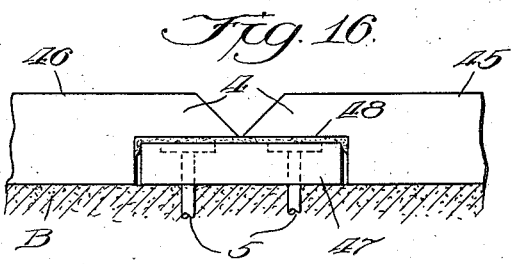
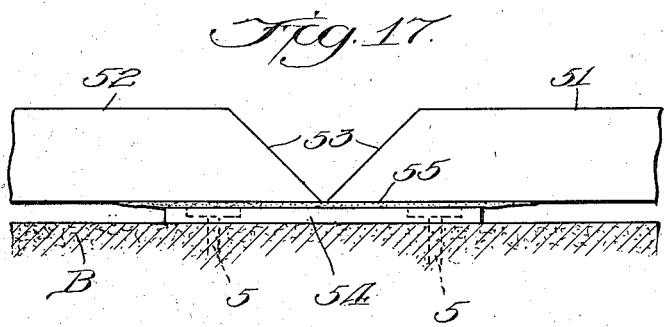

UNITED STATES PATENT OFFICE 2,068,098

FASTENING PANELS THAT SHRINK

Armin Elmendorf, Winnetka, Ill.

Application February 24, 1936, Serial No. 65,366

17 Claims. (Cl. 20—15)

Insulating wall boards of the various present commercial types could not heretofore be successfully bonded to plaster walls without both gluing and nailing them with exposed nails, because they shrink and subsequently show disfiguring open joints. The exposed heads of nails are in themselves disfiguring, and even if finishing nails are employed and are set into boards or panels of certain types, such as those faced with wood veneer, the holes remain visible and cannot be adequately filled so as to conceal their presence. When the boards are glued to the plaster stresses are set up in the face of the latter as the boards shrink. These stresses may be severe and unless the plaster is very hard and strong, will cause the boards to peel off.

The object of the present invention is to make it possible successfully to attach wall boards or the like to a plaster or other wall or support in such a manner that the foregoing objections are eliminated.

Viewed in one of its aspects, the present invention may be said to have for its object to make it possible successfully to secure to weak or green plaster walls panels that shrink.

Viewed in another of its aspects, the present invention may be said to have as objects the successful attachment of wall boards or the like to a plaster or other wall or supporting structure, without gluing the same thereto, without creating objectionable open joints upon the shrinkage of the boards, and, if desired, without leaving visible evidence of the presence of nails or the like.

In carrying out my invention I make use of lap joints each containing a layer of adhesive so elastic as to permit within the same a comparatively large amount of movement due to shear displacement and stretching, to compensate for shrinkage that takes place in either or both of two members joined together. In a preferred practical embodiment of the invention I so shape the marginal portions of the boards or panel at their meeting edges so adjacent panels lie in the same plane and yet overlap each other along their margins. The rear or underlying marginal portion at each joint is secured to the wall or other support by nails or other suitable fastenings which are then concealed by the outer or overlying element. The outer or overlying element is bonded to the section containing the fastenings by means of a layer of elastic, flexible rubber latex of appreciable thickness. This layer of bonding material provides such capacity for shear displacement and stretching within itself that the bond will not fail during normal shrinkage of the panels. Each layer of rubber latex is extended beyond the opposed borders of the overlap so that the corresponding panels remain tied together even though either panel should fail by shearing in the overlap and near the plane of the bonding layer. The meeting edges or corners of the overlapping members are so shaped, as, for example, by bevelling them to produce between them a V-shaped groove the widening of which is hardly noticeable as the panels shrink, that the unsightly open joints which could not heretofore be avoided are eliminated. In this simple arrangement, in which adjacent panels overlap each other, each panel is anchored directly to the wall at one edge only, namely at the edge where the nails or other fastenings occur. The remainder of each panel is not directly secured or bonded to anything except at the margin which overlies and is elastically bonded to the anchored part of the adjacent panel. As a modification, the panels themselves may meet in butt joints, the marginal portions at their meeting edges being reduced in thickness and nailed or otherwise fastened to the wall or other support. A batten or facing strip may overlie and be bonded to both of the marginal portions along the meeting edges of the adjacent panels, thereby producing two visible joints between a pair of panels, which joints are also so fashioned that the appearance thereof is not strikingly altered through expansion or shrinkage of the panels. This last arrangement may be reversed, the strips being nailed or otherwise fastened to the wall, the panels meeting in butt joints over the strips, and the panels being held in place simply through being bonded to the underlying strips.

The latex bonding material may be applied in various ways. I prefer to coat each of the two surfaces to be joined with the proper latex compound and permit the coatings to be dried. Then, when the two coatings on overlapping members are brought together, they may be caused to merge or consolidate into a single layer by hammering said members along the overlap. In other words, one of the panels having been nailed to a wall along one edge and having along the marginal portion at that edge a dried coating of latex, the second panel with its dried coating of latex may be set against the wall with the coated sections of the two panels lying flat against each other. Then, by hammering the panels together throughout the length of the joint, complete bonding of the panels to each other is effected.

It is of course possible to place two overlapping members together while the adhesive thereon is wet, the adhesive having been applied to either or both of such members. In that case the overlapping members must be held together by small nails or otherwise, until the adhesive has become dry and the joint be perfected by hammering the joint at points where the outermost member may have pulled away from the inner or under member.

It will thus be seen that my invention viewed in a still further aspect, may be regarded as having for its object to produce a novel wall covering or sheathing in which the panels are effectively secured only at their meeting marginal portions and are not fastened at other points, each joint containing an elastic bonding material; and, viewed in still another aspect, to have for its object to produce a novel elastic joint between members which are required to move relatively to each other in the planes thereof through appreciable distances.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a more or less diagrammatic view showing a complete panel and a fragment of an adjacent panel fastened to a wall, which view may be regarded as a section on line 1—1 of Fig. 2; Fig. 2 is a front view or elevation of a fragment of a wall sheathed with panels in accordance with the present invention; Fig. 3 is an edge view, on a much larger scale than Figs. 1 and 2, of the joint between two panels, the wall being omitted; Fig. 4 is a view similar to Fig. 3, showing the two panels separated from each other, the righthand panel being about to be set in place against the anchored marginal portion of the lefthand panel; Fig. 5 is a view similar to Fig. 3, showing a slight modification; Fig. 6 is a view similar to Fig. 5, illustrating a condition which may exist after there has been a failure of the material of the outer or forward panel; Figs. 7 and 8 are views similar to Figs. 5 and 6, respectively, showing a slightly different modification in which failure of the panel material, through shear slippage, takes place in the under or rear member of the two overlapping members; Fig. 9 is a view similar to Fig. 1, showing a further modification in which there is a layer of felt, soft rubber, or other cushioning material in the joint; Figs. 10 and 11 are views similar to Fig. 1, showing two further modifications embodying diagonal joints; Figs. 12 and 13 are views similar to Fig. 1, illustrating two different modifications in which the panels themselves do not overlap, but the overlapping is done by a batten or facing strip; Fig. 14 is a view, more or less like Fig. 1, but on a larger scale, illustrating the process of attaching panels to a plaster wall, the particular panels there shown being veneered; Fig. 15 is a view similar to Fig. 3, illustrating a modified arrangement in which finishing nails are driven through both panels to anchor the underlying rib or flange; Figs. 16 and 17 are views similar to Figs. 12 and 13, illustrating two further modifications in which the panels do not overlap, but in which the strips that unite them underlie the panels and are anchored to the wall.

Referring to Figs. 1 and 2 of the drawings, 1 and 2 represent two panels of the wallboard type, the shrinkage of which is considerable, although the invention is of course applicable to panels in which the shrinkage is no greater than it is in plywood, for example. These two panels are a part of a facing or sheathing for a wall, which may be a plaster or other wall, or be simply framework. In the arrangement shown, the wall is represented by two beams or studdings A, in order to illustrate the feature of having the panels of such widths that the joints between them may register with such beams; it being of course obvious that there may be a solid wall behind the panels. The panels are reduced in thickness along their meeting edges; one half of the thickness of each panel being cut away on the rear side at one edge and the same amount being cut away on the front side along the opposite edge; thereby providing each panel with lips or flanges extending along two opposite edges. All of the panels are alike, and I have numbered them differently only for convenience in distinguishing two adjacent panels from each other. In applying the panels to a wall they make lap joints with each other, a thin lip or flange of one panel overlying a thin lip or flange on the meeting panel. The shapes of these lips or flanges are best shown on a larger scale in Figs. 3 and 4. The marginal portion or lip 3 is adapted to lie flat against the wall or support against which the panel is placed, whereas the marginal portion or lip 4 at the opposite edge of the panel stands away from the wall or backing for the panels, leaving room between the same for the lip or flange 3 on a meeting panel.

In applying the panels to a wall or other backing, the lip 3 of one panel, as, for example, the panel 1 in Figs. 1–4, is fastened to the wall or backing by any suitable means, conveniently nails 5. The exposed face of this anchored part 3 is then coated with an elastic rubber latex compound, and the rear face of the lip or flange 4 on the panel 2, which is next to be applied, is provided with a similar coating. These coatings are preferably allowed to dry. Of course, if desired, the rubber latex coatings may be applied at any time, so that they are there in a dry condition at the time the panels are to be mounted in their positions of final use.

In any event, assuming that the lip or flange 3 on the panel 1 has been nailed or otherwise secured to the wall, and that the dried rubber latex coatings are present, the panel 2 is laid against the wall with the lip or flange 4 overlapping the anchored lip or flange 3 of panel 1. Then, by striking sharp hammer blows against the front face of the lip or flange 4, so as to drive it against the overlying lip or flange, the two rubber latex coatings unite into a single layer indicated at 8 in Fig. 3. We now have a situation as it appears in Figs. 1 and 2, and the lip or flange 3 of panel 2 may be nailed in place as shown in these latter figures. A third panel may now be applied, its lip or flange 4 being caused to overlie and be bonded to the lip or flange 3 of the panel 2.

It will thus be seen that the panels are not fastened to the wall anywhere except along two margins, so that if the wall be of plaster, the face of the plaster is not subjected to stresses occasioned by the shrinking of the panels. It will also be seen that by bonding adjacent panels together, with joints of considerable width, and employing a bonding material which permits considerable shear displacement within the same, or stretching thereof, or both, each panel may expand and contract freely, the variations of width of the panel being compensated by shear displacement in the elastic bonds.

It should be noted that while I prefer that the bonding be done at a time when the bonding material is in a comparatively dry condition, it is of course possible to bring together two surfaces either or both of which is coated with wet bonding material and, by proper manipulation and care, to secure an effective union.

An ordinary wallboard panel may shrink as much as an eighth of an inch and, if the ends of the lips or flanges 4 and the shoulders at the inner ends or bases of the flanges 3 were square so as to bring them practically into contact with each other in making the original assembly, the cracks that would open at the time of maximum shrinkage of the panels would probably be very noticeable. In order to prevent this, I bevel the ends of the lips or flanges 4 and the shoulders at the bases of the lips or flanges 3, as indicated at 9 and 10, respectively. Consequently, when the panels are assembled on a wall, the front or outer faces of adjacent panels are separated from each other by comparatively wide, deep, V-shaped grooves 11; the width of the grooves being much greater than the amount of expansion and contraction of a panel, so that the increase in width of these grooves upon the contraction or shrinkage of the panels is hardly noticeable. Also, because of the lap joints, there is never opened a passage extending from front to rear through the paneling no matter how much shrinkage takes place.

In the case of ordinary wallboards, if the amount of shrinkage be very great, the material of the panels breaks down before the rupture point of the rubber latex is reached, and a layer of the panel material, at the joint, may shear off on a plane parallel with the broad faces of the panel. Even should this occur, the bonding material still holds the injured panel in place. This is illustrated in Figs. 5 and 6, the first of which shows a joint in its initial condition. The joint is the same as that in Fig. 3, except that the layer 12 of bonding material is shown as having thickened sections, 13 and 14, near the base of the lip or flange 3 and at the base of the lip or flange 4, respectively. When the shrinkage stresses become too great, a thin layer 15 next to the bonding material may be sheared from the inner or rear side of the lip or flange 4, perhaps becoming completely separated. However, the layer of bonding material is still firmly supported by the underlying stationary lip or flange 3, and the thickened section 14 is still firmly bonded to the floating lip or flange 4 and the shoulder of the panel at the base of this lip or flange.

In Figs. 7 and 8 there is shown a slight modification that causes the failure of the panel material, should failure occur, to take place at the front side of the stationary lip or flange 3. There is no difference between the arrangement shown in Fig. 7 and that of Fig. 5, except that instead of a thickened part 14 projecting forwardly from the layer of bonding material in Fig. 5, there is a rib or bead 16 extending rearwardly or inwardly. When the panels shrink and produce shear stresses greater than the material of the panels can withstand, failure may take place in the lip or flange 4 as in Fig. 6 or a layer 17 may shear off from the front side of the lip or flange 3 as illustrated in Fig. 8.

It will be noted that although in Figs. 6 and 8 the panel 2 is assumed to have shrunk to such an extent as to produce a rupture in the panel material, the width of the V-grooves in these figures seem to be wider than in Figs. 5–7 only upon close inspection.

In Fig. 9 the joint between the two panels is much the same as in Fig. 3 except that there is glued to the front face of the lip or flange 3 a cushioning layer 18 of sponge rubber or other soft rubber, or of felt or other suitable fabric; the glue or adhesive being indicated at 19. The glue layer 19 is not intended to do more than anchor the cushion; the capacity to yield under the stresses set up during the shrinking of the panels being provided by the cushioning layer and the layer 8 of rubber latex compound. As in the other forms of the invention, the layer 8 initially constituted two coatings, one on the cushioning layer or strip and the other on the rear face of the lip or flange 4.

In Fig. 10 there is illustrated an arrangement in which the panels 21 and 22 meet in a scarf joint containing a flexible bonding layer 8 such as previously described. The panel 21 is anchored by nails driven through the inclined edge face, or other suitable fastening means, whereas the adjacent end of the panel 22 is held only by the elastic bonding material.

In Fig. 11 there is shown a construction similar to that in Fig. 10, the only difference being that the thin end of the lip on the panel 22 is cut off to provide a face 23 which with that part of the inclined edge face on the panel 21 that is now exposed, produces a V-groove as in the previous forms.

While the capacity to yield, in both Figs. 10 and 11, is afforded to some extent by shear displacement occurring in the latex bond, it is also due to some extent to the direct stretching of the bonding layer under tensile stresses imposed thereon.

In Fig. 12 I have shown a further modification in which the panels do not actually overlap. In this arrangement, the panels simply meet edge to edge, each being cut away at both edges to provide lips or flanges 27 similar to the lips or flanges 3 in the other forms. Both of these lips or flanges on each panel are nailed or otherwise fastened to the walls. The flanges themselves and the nails or fastenings are concealed by a strip or batten 28 of suitable material bonded to the front faces of the lips or flanges 27 by means of a layer 8 of rubber latex compound. The front longitudinal corners of the strip or batten 28 are cut away so that there appear at each joint between panels a pair of parallel V-grooves 29 spaced a short distance apart.

In Fig. 13 I have disclosed a modification of the arrangement illustrated in Fig. 12. The two panels 31 and 32 are cut away to provide lips or flanges 33 corresponding to the flanges 3 in Fig. 3; there being square shoulders 34 at the bases of these flanges. A strip or batten 35 fits into the groove or panel between the shoulders, 34, 34, and is bonded to the lips or flanges 33 by the layer 8 of rubber latex compound. The front face of the strip or batten 35 is made convex, as indicated at 36, so that if there is a slight opening of the joints between this member and the shoulders on the panels, it will not be as noticeable as though the batten had a flat front face lying flush with the front faces of the panels.

In Fig. 14 there is a plaster wall B, against which has been placed a panel 41 whose flange 3 is illustrated as being nailed to the wall. The panel 42 is about to be set in place with its flange 4 overlying the anchored flange 3 of the other panel. The meeting faces of the flanges are shown as being coated with rubber latex, as at 6 and 7, respectively. After the panel 42 has been set against the wall, nails are driven through its flange 3. Thus each panel is secured along two opposed edges, the remaining area of each panel being unattached to the wall. The panels here illustrated are faced with veneer 43 which covers their outer faces and also the bevelled edges or shoulders 9 and 10. It will be seen that the veneer is not marred by the presence of nail heads or nail holes.

In Fig. 15 the arrangement is the same as in Fig. 3, except that finishing nails 44 are driven through the flange 4 as well as through the flange 3. While these nails, particularly if driven in at an acute angle to the wall, serve to anchor the flange 3, they have little holding effect on the flange 4 which depends for its attachment to the wall almost entirely on the rubber latex bonding layer 8. This method of attachment may in some cases be useful, particularly where the small holes produced by finishing nails are not objectionable.

The panels 45 and 46 in Fig. 16 have flanges 4 at both long edges, so that all of the flanges stand away from the wall. Consequently, the meeting flanges of adjacent panels form with the wall a wide shallow tunnel extending throughout the lengths of the panels. In each of these tunnels is positioned a strip 47 which is fastened to the wall, as by means of nails 5. The flanges 4 are bonded to the outer face of the underlying strip by a layer 48 of the elastic bonding material. It will be seen that the strip is narrower than the tunnel in which it lies so that the layer of bonding material may project beyond the long edges of the strip and be bonded effectively to the panels inwardly from the points at which rupture of the panel material may perhaps occur if the shrinkage stresses become very great.

In Fig. 17 the panels 51 and 52 have no flanges but are simply bevelled at their meeting edges, as at 53 to produce a V-groove when assembled. Underlying the marginal portions of both panels, at the meeting edges of two panels, is a strip 54, of any suitable material which may be nailed or otherwise fastened to the wall. The panels are bonded to the strip by the layer 55 of elastic bonding material which is wider than the strip and projects past both long edges of the latter. In this construction, the panels not only are not fastened to the wall at points between opposed margins, but they are actually held clear of the wall by the supporting strips.

While I have illustrated and described with particularity only a single preferred form of my invention, with a few modifications, I do not desire to be limited to the exact structural details thus illustrated and described; but intend to cover all forms and arrangement which come within the definitions of my invention constituting the appended claims.

I claim:
1. In combination, a support and a member engaged with the same, fastenings securing said member to the support, a second member overlapping the first member, and a layer of bonding material between and joining the overlapping portions of said members together, said bonding material being sufficiently elastic to provide therein sufficient shear displacement and stretching to permit a considerable relative movement between said members parallel to the plane of the joint.

2. In combination, a support and a member engaged with the same, fastenings securing said member to the support, a second member overlapping the first member, at least one of said members being a fibrous panel that shrinks and expands as the atmospheric humidity changes, and a layer of bonding material between and joining the overlapping portions of said members together, said bonding material being sufficiently elastic to provide therein sufficient shear displacement and stretching to permit a considerable relative movement between said members in the plane of the panel.

3. In combination, a support and a member engaged with the same, fastenings securing said member to the support, a second member overlapping the first member, and a layer of bonding material between and joining the overlapping portions of said members together, said bonding material being sufficiently elastic to provide therein sufficient shear displacement and stretching to permit a considerable relative movement between said members parallel to the plane of the joint, and said layer of bonding material being wider than the overlap between said members and extending beyond opposed edges of the overlap in order to maintain a bond between said members in the event that one or the other of said members fails by shearing within the overlap and near the plane of the joint.

4. In combination, a support, a member anchored to said support, a panel having a marginal portion overlapping the said member, and a layer of adhesive material between and bonding together the overlapping portions of said panel and said member, said adhesive material being elastic and having the capacity to permit considerable displacement between said member and the panel without rupturing.

5. In combination, a support, a member anchored to the same, a panel having a marginal portion overlapping said member, and a layer of flexible elastic rubber latex compound underneath said marginal portion of the panel and forming the bond between said member and said panel to hold them together, said latex compound being sufficiently elastic to permit a substantial amount of displacement between said member and the panel without rupturing.

6. In combination, a support, a panel engaged with the same, fastenings along a marginal portion of the panel securing it to said support, a member overlapping said marginal portion of the panel and concealing the fastenings, and a layer of bonding material underneath said member and overlying the panel to form the joint between said member and said panel to hold them together, said bonding material being sufficiently elastic to permit a substantial amount of displacement between the said member and the panel without rupturing.

7. In combination, a support, a series of panels forming a facing for said support, each panel being anchored along one edge to said support and at its opposite edge overlapping the anchored marginal portion of an adjacent panel and thereby concealing the anchoring means, and a layer of adhesive material underlying the outer of said overlapping portions between and bonding together the overlapping portions of said panels, said adhesive material being elastic and having the capacity to permit considerable displacement between adjacent panels without rupturing.

8. In combination, a support, a series of panels engaged with and comprising a facing for the same, fastenings along a marginal portion of each panel anchoring it to said support, the marginal portion at the opposite edge of each panel overlapping the anchored marginal portion of an adjacent panel and concealing the fastenings, and a layer of bonding material in each joint between said panels to hold the panels together, said bonding material being sufficiently elastic to permit a substantial amount of shear displacement within the same and stretching thereof without rupturing.

9. In combination, a support, a series of panels each anchored along one edge to said support and at the opposite edge overlapping the anchored marginal portion of an adjacent panel and thereby concealing the anchoring means, and a layer of elastic rubber latex compound underlying the outer of said marginal portions of each panel and bonding together the overlapping portions of each adjacent pair of said panels, the edges of the panels meeting in the face of the structure being bevelled to produce V-shaped grooves.

10. In combination, a rigid backing, a sheathing comprising a series of panels arranged side by side in engagement with the backing, said panels being shaped at their meeting edges to form lap joints, the arrangement being such that marginal portions along opposed edges of each panel respectively overlie and underlie complementary marginal portions on two adjacent panels between which the first panel is positioned, means anchoring each underlying marginal portion to the backing, and a bonding material between the marginal portions of each overlapping pair, said bonding material being elastic and having the capacity to permit considerable shear displacement within the same and stretching thereof without rupturing.

11. In combination, a rigid backing, a sheathing comprising a series of panels arranged side by side in engagement with the backing, said panels being shaped at their meeting edges to form lap joints, the arrangement being such that marginal portions along opposed edges of each panel respectively overlie and underlie complementary marginal portions on two adjacent panels between which the first panel is positioned, means anchoring each underlying marginal portion to the backing, and a bonding material between the marginal portions of each overlapping pair, said bonding material being elastic and having the capacity to permit considerable shear displacement within the same and stretching thereof, without rupturing, and the free long edge of each of said overlying marginal portions of the panels and the shoulder at the base of each of said underlying portions being shaped to provide a wide V-shaped groove along the joint between each adjacent pair of panels.

12. In combination, a rigid backing, a sheathing comprising a series of panels arranged side by side in engagement with the backing, each panel being reduced in thickness along opposed edges to provide a rear or inner flange which engages with the backing and a front or outer flange complementary to each other, the rear or inner flange of each panel being anchored to the backing and the front or outer flange overlying the anchored inner flange on an adjacent panel, and a layer of elastic rubber latex compound between and bonding together each pair of overlapping flanges, the free long edge of each outer flange and the shoulder at the base of each inner flange being shaped to form between them a wide, deep V-shaped groove in the face of the sheathing at the juncture of each pair of panels.

13. In combination, a rigid backing, a sheathing comprising a series of panels arranged edge to edge and engaged with the backing, the panels being rabbeted along their meeting edges to produce flange or lip sections in contact with the backing and a wide groove in the face of the sheathing at the juncture of each pair of panels, fastenings extending through said flanges or lips and into the backing, a batten in each groove, and a layer of bonding material securing the battens to the underlying flanges or lips, said bonding material being elastic and having the capacity to permit considerable shear displacement within the same and stretching thereof without rupturing.

14. In combination, a rigid backing, a sheathing comprising a series of panels arranged edge to edge and engaged with the backing, the panels being rabbeted along their meeting edges to produce flange or lip sections spaced apart from the backing and a wide groove in the rear face of the sheathing at the juncture of each pair of panels, strips in each groove, fastenings securing said strips to the backing, and a layer of bonding material securing the strips to the overlying flanges or lips, said bonding material being elastic and having the capacity to permit considerable shear displacement within the same and stretching thereof without rupturing, the meeting edges of the panels thereto being bevelled to form in the face of the sheathing wide V-shaped grooves extending throughout the length of the joints.

15. In combination, a support, a panel anchored along one edge to said support, a member overlapping the anchored marginal portion of the said panel and thereby concealing the latter, and the anchoring means, a cushioning layer overlying and adhered to said anchored marginal portion, and a layer of adhesive material between and bonding together the said cushioning layer and said member, said adhesive material being elastic and having the capacity to permit considerable shear displacement within the same without rupturing.

16. In combination, a support, panels arranged side by side and engaged with the support, said panels making scarf joints with each other, fastenings securing to the support the underlying member of each pair of overlapping panel parts, and a layer of bonding material in each joint between panels to hold them together, each layer of bonding material extending across the entire width of the inclined faces between which it lies, said bonding material being sufficiently elastic to permit a substantial amount of displacement between said panels in the plane of the panels without rupturing.

17. In combination, a support, a series of panels engaged with and comprising a facing for the same, the panels meeting edge to edge, strips fastened to said support behind the meeting edges of each pair of panels, and a layer of bonding material between each strip and the two overlying panels to hold the panels together, and to said support, said bonding material being sufficiently elastic to permit a substantial amount of displacement between the panels in the plane thereof without rupturing.

ARMIN ELMENDORF.